(12) United States Patent
Schweizer et al.

(10) Patent No.: US 7,669,923 B2
(45) Date of Patent: Mar. 2, 2010

(54) SEAT, ESPECIALLY AN AIRCRAFT PASSENGER SEAT

(75) Inventors: Oliver Schweizer, Lindenberg (DE); Mauro Rossi, Eriskirch (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 51 days.

(21) Appl. No.: 11/447,184

(22) Filed: Jun. 6, 2006

(65) Prior Publication Data

US 2006/0284465 A1     Dec. 21, 2006

(30) Foreign Application Priority Data

Jun. 14, 2005   (DE) ................. 10 2005 027 375

(51) Int. Cl.
*A47D 15/00* (2006.01)
*B60N 2/00* (2006.01)

(52) U.S. Cl. .................. 297/182; 297/354.13

(58) Field of Classification Search ............ 297/182, 297/463.2, 423.15, 452.38, 354.13
See application file for complete search history.

(56) References Cited

U.S. PATENT DOCUMENTS

| | | | | |
|---|---|---|---|---|
| 1,736,503 A * | 11/1929 | Marshall | ............ | 297/344.1 |
| 2,602,490 A * | 7/1952 | Earl | ............ | 297/423.15 |
| 3,698,673 A * | 10/1972 | Olsen | ............ | 248/421 |
| 5,161,854 A * | 11/1992 | Yokoto et al. | ............ | 297/182 |
| 6,394,542 B2 * | 5/2002 | Potisch et al. | ............ | 297/182 |
| 6,412,870 B1 * | 7/2002 | Higgins et al. | ............ | 297/342 |
| 6,871,910 B2 * | 3/2005 | Hale | ............ | 297/330 |

FOREIGN PATENT DOCUMENTS

DE          100 19 484          10/2001

* cited by examiner

*Primary Examiner*—Sarah B McPartlin
(74) *Attorney, Agent, or Firm*—Posz Law Group, PLC

(57) ABSTRACT

A seat, especially an aircraft passenger seat, has seat components such as a seat part, a seat back (3), and a shell body (5). The shell body forms at least a partially rear enclosure (9) of the seat part and the seat back (3). With an adjusting mechanism, the seat part and the seat back (3) can be adjusted in position relative to one another and relative to the rear enclosure (9). The distance between the rear enclosure and the seat back (3) is variable. A cover assembly (31, 45) bridges a distance formed by the variable distance between the seat back (3) and enclosure (9) between formed gaps.

28 Claims, 5 Drawing Sheets

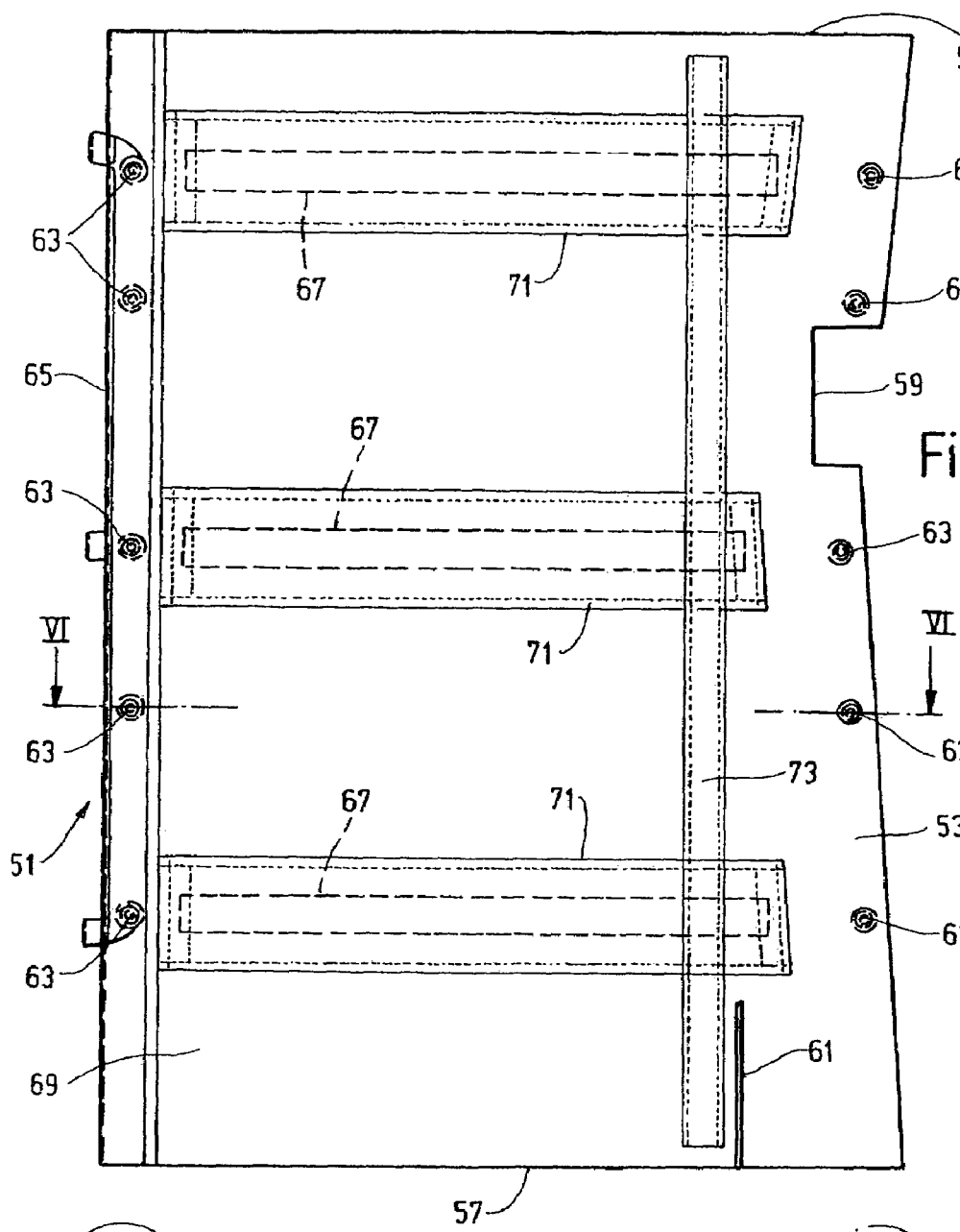
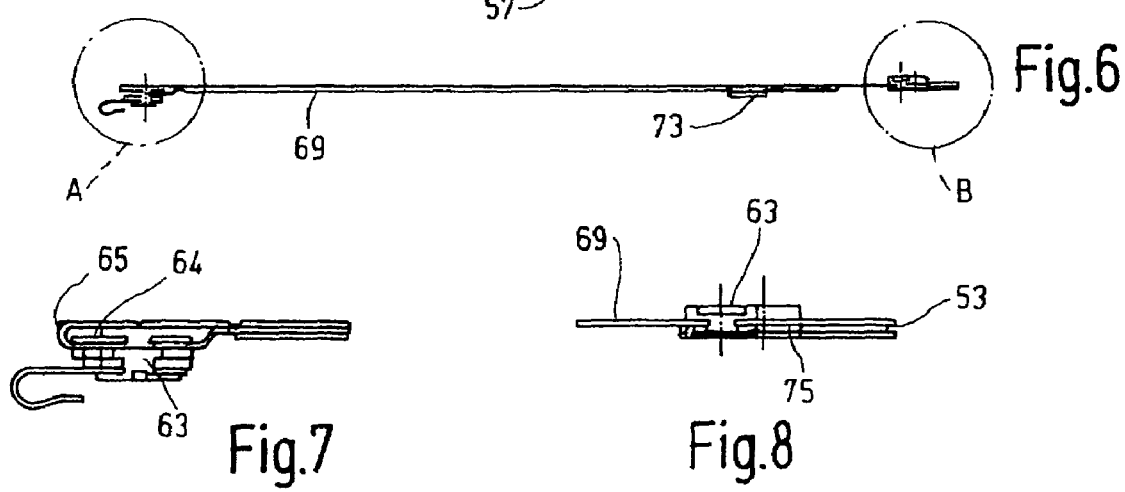

SEAT, ESPECIALLY AN AIRCRAFT PASSENGER SEAT

FIELD OF THE INVENTION

The present invention relates to a seat, especially an aircraft passenger seat, with seat components such as a seat part, a seat back, and a shell body forming at least a partially rear enclosure of the seat part and/or the seat back. The seat part and the seat back can be adjusted in position relative to one another and relative to the rear enclosure, with the distance between the rear enclosure and the seat back being variable.

BACKGROUND OF THE PRESENT INVENTION

Adjustable seats designed for modes of transportation for conveyance of passengers are known in the prior art. DE 100 19 484 A1, for example, discloses such a seat intended especially for use as an aircraft passenger seat in passenger aircraft.

On very long trips, such as on long-distance flights and for passages aboard a ship, for example, a ferry, a general object of aircraft or ferry outfitters to increase the comfort of the seat users and the passengers to be transported. Especially in first class and business class, the customer has the corresponding wishes to be satisfied. The trend includes the desire of passengers to be able to use the travel time for useful resting or for sleeping, for example, to effectively counteract fatigue phenomena at the destination in long-distance flights or the like.

To meet these demands, efforts are being made to configure the adjustment means and the interacting seat components such that diverse, individually triggerable adjustment positions especially for the seat part and seat back are made available to the seat occupant to adapt the overall seating system to his/her requirements. A comfortable resting or sleeping position can be made available to the seat occupant, in which the seat part in the travel direction (flight direction) is pushed comparatively far forward and the seat back can be tilted back low to the rear within the shell body. An essentially elongated shape necessarily arises for the shell body, with its rear area forming the rear enclosure of the seat back.

This design leads to seat configurations in which the seat part is in a position shifted correspondingly far forward and the seat back is in the upright starting position, as is prescribed in flight operation, for example, during taxiing, take-off and landing, where an intermediate space is caused between the rear enclosure and the seat back. This intermediate space forms a gap between the lower end area of the seat back and the adjacent wall areas of the shell body. The presence of a gap in this area leads to the fact that, beyond the edge of the rear enclosure on the shell body, there is the possibility of access to the area of the bearing structure of the seat part located underneath the bottom end of the seat back. In this area underneath the seat bottom, there are however the kinematics of the seat adjustment means, for example, upright seat legs or toggle lever arrangements which can pivot and which belong to the adjustment mechanism. This arrangement results in the danger that articles, such as drinking vessels, bottles, beverage cans, or the like which accidentally fall over the edge of the enclosure into the shell body pass through the gaps into the region of these kinematics and lead to malfunctions or damage the mechanisms. Additionally, there is the danger that individuals, for example, children at play, can reach into the gaps which have formed and possibly injure themselves on the moving parts of the kinematics.

SUMMARY OF THE INVENTION

An object of the present invention is to provide a seat, especially an aircraft passenger seat, in which the danger of malfunctions by damage to the seat kinematics as well as the possible danger of injury caused by that gap are prevented.

This object is basically achieved by a seat having a cover assembly which bridges the gap formed between the seat back and the rear enclosure on the shell body in the corresponding position settings. The danger that malfunctions will occur due to articles accidentally falling over the edge of the enclosure on the shell body into the interior and also the danger that an individual reaching into the shell body between the seat back and enclosure could be injured are then avoided.

To adapt to the variable size of the gap formed by the corresponding position settings, the cover assembly can have at least one cover element of variable shape or location.

In one advantageous exemplary embodiment, for this purpose a cover element is attached to a component articulated to the bearing structure of the seat part, is adjacent to the gap to be bridged, and can be moved relative to the rear enclosure on the shell body when a change in the position of the seat part is induced by the adjusting means.

The component bears this cover element, and can be a pivotable toggle lever belonging to a toggle lever arrangement that is a component of the seat kinematics, as is conventional in the seat systems under consideration. In these seat kinematics, a toggle lever coupled to the seat bottom of the seat part in the displacement motion of the seat part and seat back forward (travel or flight direction) executes a pivoting motion in which the cover element attached to it is raised out of a folded-down position such that it travels into the bridging position at least partially closing the gap which has formed.

In these exemplary embodiments, the cover assembly, in addition to the first cover element located on the toggle lever, can have a second cover element extending in the direction to this first cover element and attached to the wall part of the enclosure adjacent to the gap. In this connection, the first cover element and the second cover element each form a partial bridge of the gap. The cover elements are movable relative to one another when the size of the gap changes.

Preferably, the second cover element located on the enclosure is movably attached to the enclosure so that position changes arising for the first cover element when the position setting changes can follow.

The two cover elements can be thin plates, for example, of a plastic material of relative strength selected with respect to the required fire safety, or a metallic material. One plate overlaps the other. The extent of overlapping changes according to the respective size of the gap to be bridged.

In one especially simple design, the second cover element is mounted on the enclosure to be able to pivot around an axis extending in the transverse direction of the seat, and is pretensioned for non-positive contact with the overlapping point on the first cover element.

Instead of using plate-disc shaped cover elements, a flexible cover element can span the gap and can be anchored on the one hand to the seat part or seat back and on the other to the rear enclosure.

In this connection, it can be a tensionable strip or net structure which is rubber-elastically resilient. This strip or this net can be made such that it can be pulled out of a contracted configuration to a greater longitudinal extension when a corresponding gap, which is to be spanned by the flexible element, is formed with the corresponding position settings.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 5 is a top plan view of a cover element of a second exemplary embodiment of a seat according to the present invention in the form of a rubber-elastically resilient strip shown in the stretched state;

FIG. 6 is an end elevational view in section along line VI-VI of FIG. 5; and

FIGS. 7 and 8 are partial end elevational views of the areas labeled A and B, respectively, in FIG. 6 which are enlarged compared to FIG. 6.

DETAILED DESCRIPTION OF THE INVENTION

Figure 1:
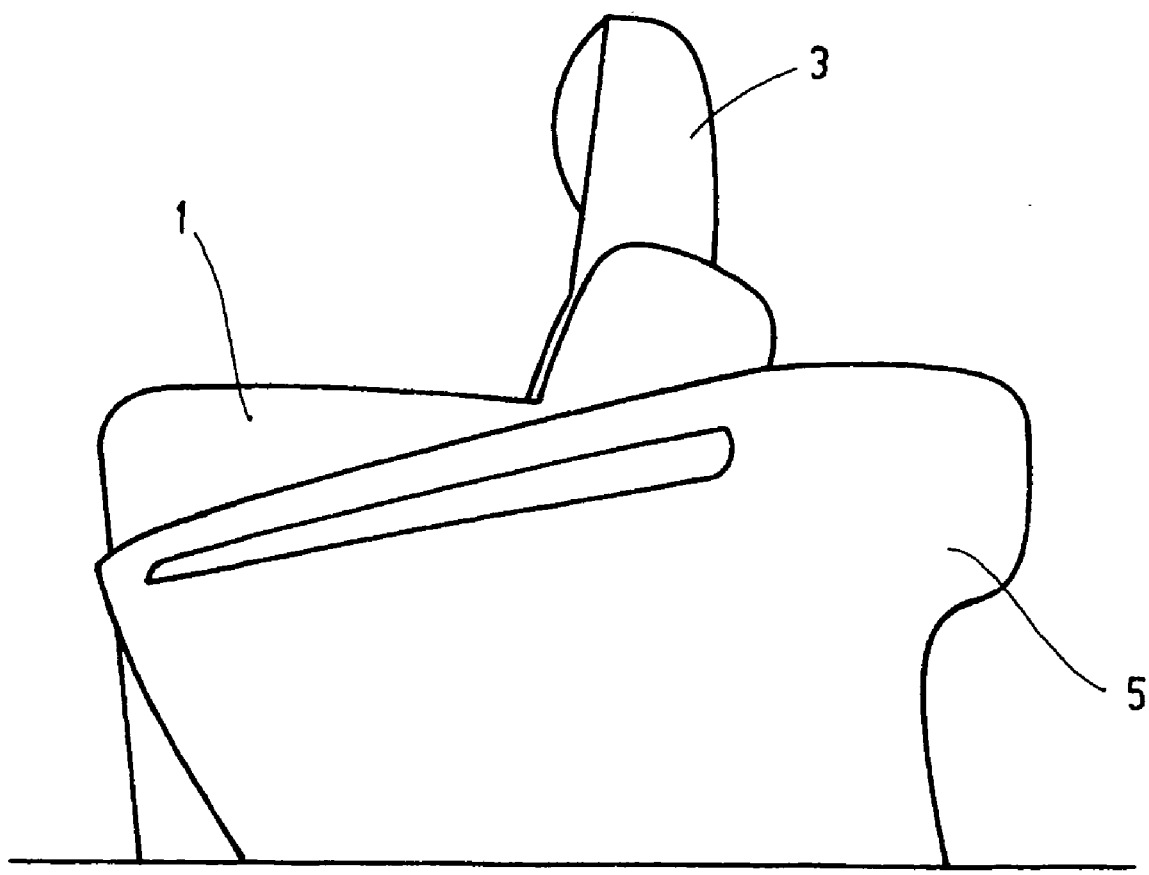
FIG. 1 is a highly schematic, simplified, side elevational view of a seat according to one exemplary embodiment of the present invention in the form of an aircraft passenger seat, the initial position being shown in which the seat back is in the upright position setting (TTL position)

FIG. 1 shows in a highly schematically simplified view one exemplary embodiment of the seat of the present invention in the form of an aircraft passenger seat for increased comfort demands (for example, first-class or business-class). The seat part 1 and seat back 3 are partially encompassed by a shell body 5 forming a side and rear enclosure. As is apparent from FIG. 1, the shell body 5 is lengthened to the rear beyond the area of the seat back 3 located in the upright position setting and the rear area of the seat 1. Seat back 3, for transferring the seat into the resting or sleeping position, can then be tilted back so far that the upper end area of the seat back 3 is located within the rear enclosure formed by the shell body 5. As can be seen most clearly from FIG. 4, the shell body 5 between its side walls 7 and the inner rear wall 9 extending down and forward and forming the rear enclosure forms enough interior space to tilt the seat back 3 so far to the rear into the shell body that a comparatively flat sleeping position is attained.

Figure 2:
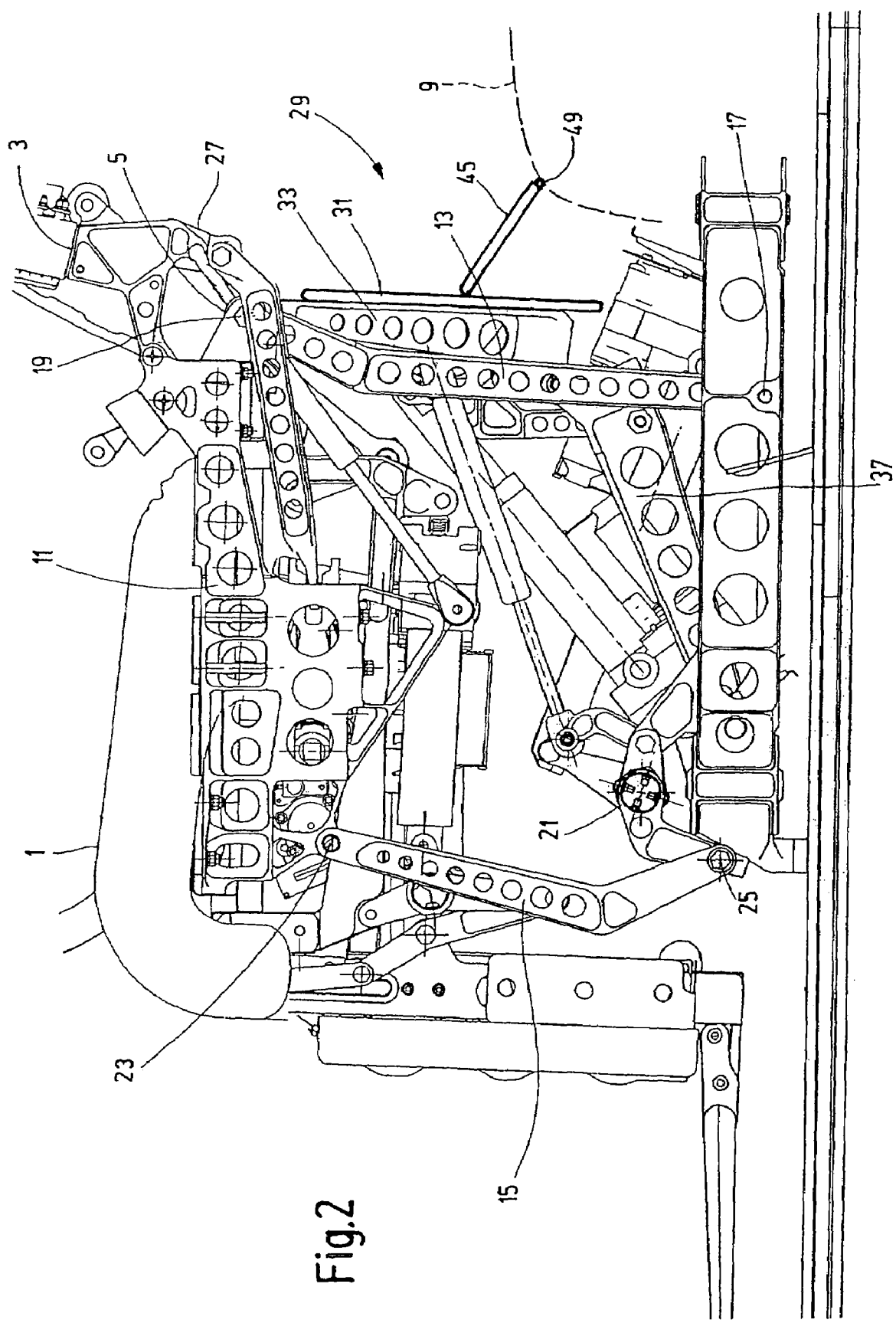
FIG. 2 is a cutaway, dismounted side elevational view, enlarged compared with FIG. 1, of structural elements of the seat part and the transition area to the seat back structure, the components of the seat kinematics belonging to the adjustment means being in the positions corresponding to the initial position shown in FIG. 1.
Figure 3:
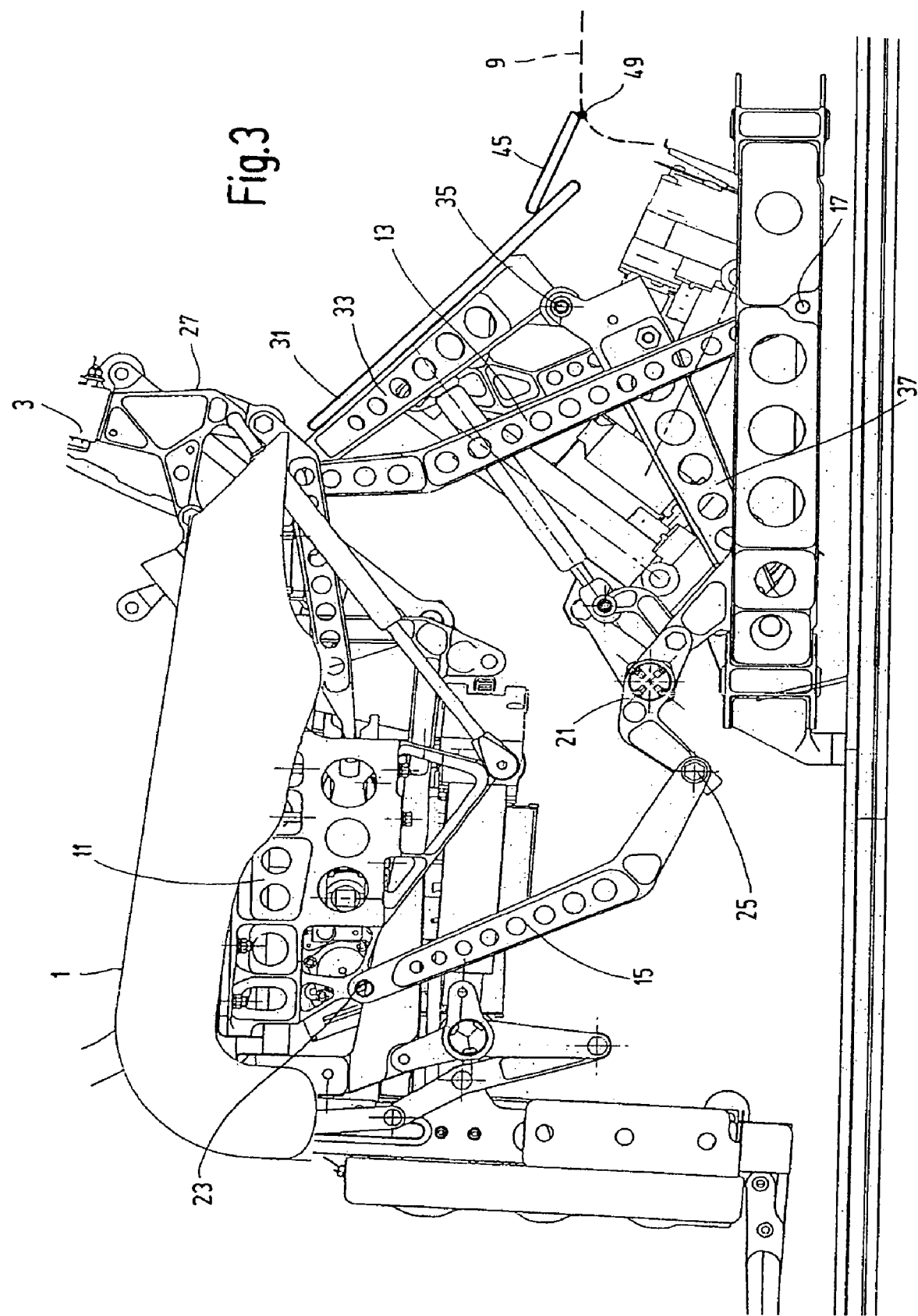
FIG. 3 is a side elevational view corresponding to FIG. 2, but with the components of the seat kinematics being in the positions corresponding to the position setting of the seat part shifted forward (in the flight direction)

FIGS. 2 and 3 show details of the kinematics located as a component of the seat adjustment means underneath the seat bottom 11 and of the lower end region of the seat back 3. Of the plurality of the mostly movable components in this regard, only those are described which are critical to the understanding of this present invention. They include a rear pair of upright legs with one side upright leg 13 each (only the upright leg 13 facing the viewer is shown) and a front pair of upright legs with side upright legs 15 (likewise only one shown). While the upright legs 13 of the rear pair are made in one piece and are articulated at 17 to the cabin deck and at 19 to the seat bottom 11, the upright legs 15 of the front pair are not connected directly to the cabin deck. The front upright legs are each connected via one angle lever 21 to the cabin deck. The angle levers 21 belong to a differential gear which is not detailed here, and which causes vertical compensation in swiveling movements of the rear upright legs 13 which take place for position adjustment. The upright legs 15 are then coupled to the seat bottom 11 at 23 with their top end keep the seat bottom 11 free of tilting for position adjustments running longitudinally. With their other ends, the upright legs 11 are articulated to the pertinent angle lever 21 at 25. The comparison of FIGS. 2 and 3 for position adjustment of the seat bottom 11 forward shows the corresponding position change of the angle lever 21 and thus of the respective upright leg 15.

In FIGS. 2 and 3, within the enclosure formed by the shell body 5 between the rear wall 9 and the lower end area 27 of the seat back 3 connected to the rear area of the seat bottom 11, an intermediate space forms a gap 29. As a comparison of FIGS. 2 and 3 shows, the size of this gap 29 is variable depending on the seat setting of the seat part 11 and the seat back 3, i.e., the size of the gap 29 increases to the front when the seat part 1 is moved, see FIG. 3, compared to the rear position setting of the seat part 1 shown in FIG. 2.

Figure 4:
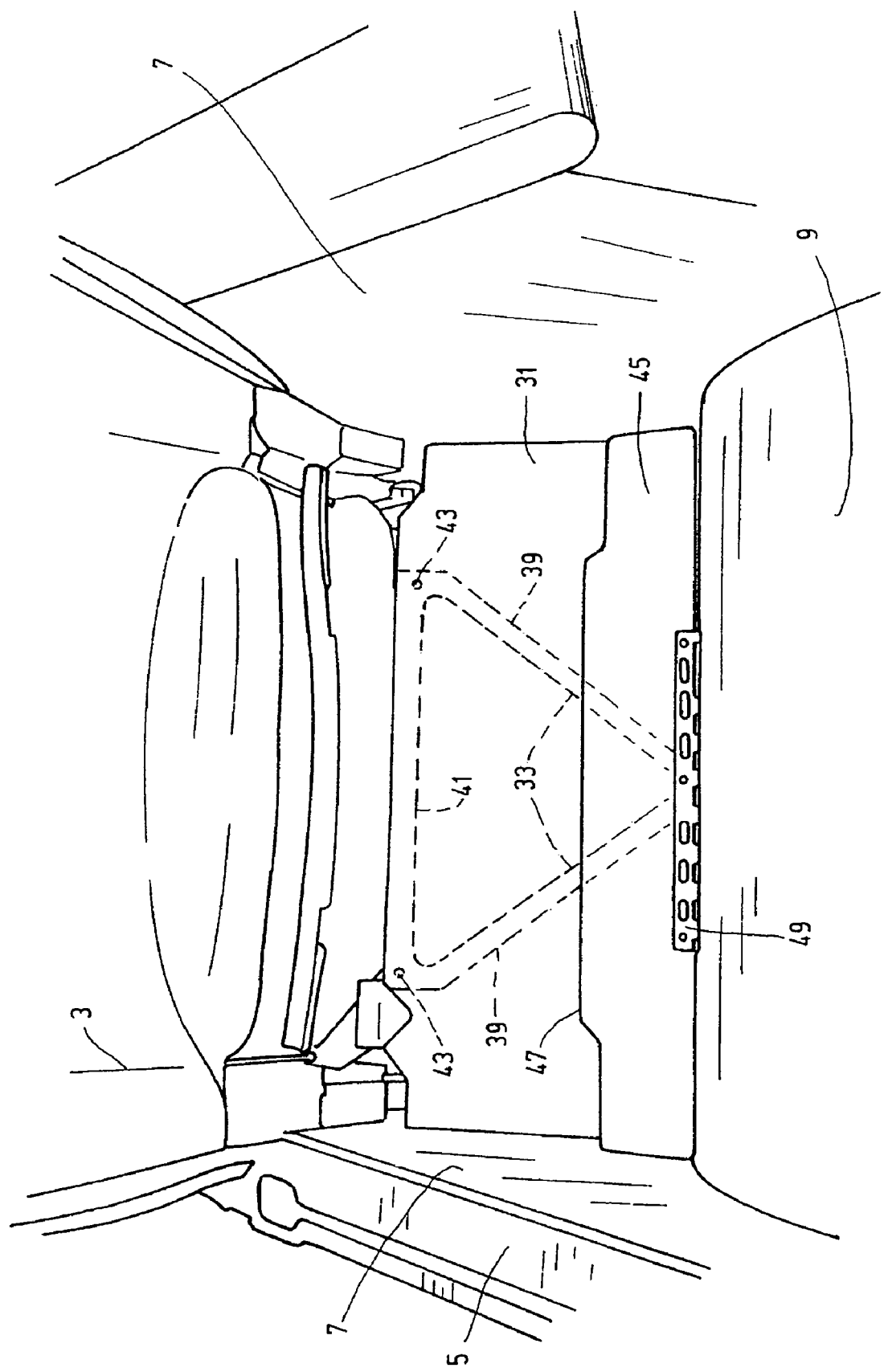
FIG. 4 is a highly schematic, cutaway perspective view of the area located within the seat shell body between the seat kinematics found under the seat bottom and the rear inside wall part of the shell body, the position setting corresponding to FIG. 3.

FIGS. 2 and 3 show a first exemplary embodiment of the seat of the present invention in which a cover means or cover assembly closes this gap 29 of variable size. The cover means has a first plate-like cover element 31 which, as FIG. 4 shows best, is a plate body with a largely rectangular outline and with a width extending essentially over the entire interior of the shell body 5 between its side walls 7. As FIGS. 2 and 3 show, this cover element 31 is attached to the rear side of an upper toggle lever 33 articulated on its upper end to the seat bottom 11 and on its lower end is connected at the toggle joint 35 to a lower toggle lever 37, which is turn is articulated on its bottom end to the cabin deck. As FIG. 4 shows, in particular, the upper toggle lever 33, proceeding from the toggle joint 35, has lever arms 39 which extend apart from one another to the top in a V-shape and which are connected by a cross arm 41. On cross arm 41 is the articulated connection to the seat bottom 11. The plate-like cover element 31 is connected via blind rivets 43 to the cross arm 41, see FIG. 4. The cover element 31 interacts with the second cover element 45 which is likewise made plate-like, and as is shown schematically simplified in FIGS. 2 and 3, is movably supported on the rear wall 9 of the shell body. This second cover element 45, like the first cover element 31, has a largely rectangular outline, aside from the slightly projecting strip 47 on the front end edge. Cover element 45 extends essentially over the entire width of the intermediate space between the side walls 7 of the shell body 5. As illustrated in FIG. 4, the second cover element 45, viewed in the flight direction, has a smaller dimension than the first cover element 31, and is attached to the rear wall by a spring hinge 49. The spring pretension of the hinge 49 keeps the cover element 45 in contact with the other cover element 31.

Based on this arrangement, the cover elements 31 and 45 in combination form a closure of the gap 29. When the seat part 1 moves from the position shown in FIG. 2 into the position shown in FIG. 3 and due to the associated movement of the toggle lever 33, the cover element 31 in its lower region rises into the gap 29. At the same time, the extent of overlapping is reduced by the other cover element 45 adjoining the cover element 31 under the spring pretensioning of the hinge 49.

Preferably the cover elements 31 and 45 are produced from a fire-retardant plastic material, for example, KYDEX®.

FIGS. 5 to 8 illustrate a second exemplary embodiment of the present invention in which, instead of plate-like cover elements, a single flexible cover element 51 is used for the cover assembly. The cover element 51 shown in FIG. 5 in the tensioned or stretched state has a rectangular outline, aside from one longitudinal edge which is not straight and which forms the end edge 53 designed to be attached to the rear wall 9 of the shell body 5. This end edge 53, proceeding from the side edges 55 and 57, extends slightly obliquely to the inside to a recess 59 offset from the middle area and closer to the side edge 55. On the side edge 57, away from the recess 59, a slot-like notch 61 is provided. Both the recess 59 and the notch 61 are used as an adaptation aid to promote the conformation of the flexible cover element 51 in the area of its end edge 53 for attachment to the rear wall 9, if the rear wall 9, for construction reasons possibly does not have a flat shape in the attachment area.

As in the rigid cover elements 31 and 45, the flexible cover element 51 also extends essentially over the entire intermediate space between the side walls 7 of the shell body 5.

In the illustrated second exemplary embodiment, push buttons 63 on the end edge 53 to attach to and interact with push buttons on the corresponding push button strip on the wall 9.

On the edge 65 facing the seat bottom 11, the cover element 51 likewise has push buttons 63. They can be provided on or next to a stiffening element extending along the edge 65, for example, of a tape 64 of KYDEX® (FIG. 7). The push buttons 63 can interact for connecting the cover element 51 to the seat structure, for example, directly with a push button strip attached to a component located on the lower end area 27 of the seat back 3 or optionally on a cross arm 41 on which in the above described example the cover element 31 is attached by blind rivets 43 or can interact with a push button strip fixed, for example, via an adhesive closure. Alternatively, instead of the push buttons 63, an adhesive closure link to the two edges 53 and 65 can be used.

The cover element 51 has three rubber bands 67 uniformly distributed over the width of the cover element 51, extending in the longitudinal direction, and ending at a short distance from the rear end edge 53. The front edge 65 of the strip 69 forms the main body of the cover element 51. The rubber bands 67 are connected to the strip 69 formed of a fabric, braid, or knit of flame-retardant material, for example, of LANTAL®. The rubber bands 67 are bordered with a cut piece 71 of the same material of the cover element 51. These cut pieces 71 are each sewn to the strip 69. The rubber bands 67 likewise are sewn to strip 69 on the end side.

A reinforcing tape 73 of KYDEX® is likewise sewn to the material of the strip 69, and forms transverse stiffening of the strip 69. This tape 73 extends in the vicinity of the rear end edge 53 parallel to the front edge 65, and is sewn to the strip 69. Along the rear end edge 53, a reinforcing tape 75 of KYDEX® is sewn to the strip 69, and extends next to the push buttons 63.

Due to the flexible cover element 51 in the form of a correspondingly cut strip 69 with rubber bands 67, stiffening tapes 64, 73, 75, recesses 59 and notches 61, a cover element is formed which essentially completely covers the gap 29. When the gap size varies, cutstrip 69 automatically adapts to the gap geometry.

While various embodiments have been chosen to illustrate the invention, it will be understood by those skilled in the art that various changes and modifications can be made therein without departing from the scope of the invention as defined in the appended claims.

What is claimed is:

1. A seat, comprising:
   a seat part;
   a seat back having a user seat back supporting face in at least an upright sitting position thereof, said seat part extending forwardly from said seat back;
   a shell body forming a rear enclosure for said seat part and said seat back and having side walls facing one another and extending perpendicularly to said back supporting face;
   an adjusting mechanism located laterally between said side walls and coupled to said seat part and said seat back to vary positions of said seat part and said seat back relative to each other and to said rear enclosure with a distance between said seat back and said rear enclosure, said seat back being above said adjusting mechanism relative to a vertical direction perpendicular to a cabin floor, wherein the shell body has a rear wall that forms the rear enclosure, connects the side walls, extends substantially perpendicular to the side walls, and is placed rearwardly beyond said adjusting mechanism;
   a support mounting said adjusting mechanism on the cabin floor and being located below the adjusting mechanism relative to the vertical direction; and
   a cover assembly that is distinct from said rear wall and that bridges a gap of variable distance between said seat back and said rear enclosure,
   wherein said seat part and said seat back are movable relative to said side walls and to said rear wall of said rear enclosure,
   wherein said side walls and said rear wall enclose a space,
   wherein said cover assembly has an upper surface relative to said vertical direction, and the upper surface forms a covering surface that bridges said gap between said seat back and said rear enclosure, and
   wherein the covering surface is arranged within said space enclosed by said side walls and said rear wall.

2. A seat according to claim 1, wherein said seat back is tiltable relative to said seat part to a low position in which an upper end area of said seat back is located within said space enclosed by said side walls and said rear wall.

3. A seat according to claim 2, wherein said seat back is tiltable rearwardly relative to said seat part into said shell body to provide a flat sleeping position of said seat part and seat back.

4. A seat according to claim 2, wherein said covering surface is covered by said seat back from above relative to said vertical direction when said seat back is in said low position.

5. A seat according to claim 1, wherein said cover assembly bridges said gap of variable distance between said seat back and said rear wall of said rear enclosure.

6. A seat according to claim 5, wherein the gap is formed between a lower end area of said seat back and said rear wall.

7. A seat according to claim 1, wherein said cover assembly comprises a first cover element which is articulated to said rear wall in a region of said rear wall which is situated lower than a top edge of at least one of said side walls relative to said vertical direction.

8. A seat according to claim 7, wherein said region of said rear wall protrudes from a rear side of said rear wall forwardly towards the adjusting mechanism.

9. A seat according to claim 1, wherein said covering surface is arranged lower than a lower end area of said seat back with respect to the vertical direction.

10. A seat according to claim 1 wherein said cover assembly comprises at least one cover element of variable shape.

11. A seat according to claim 10 wherein said cover assembly comprises a flexible cover element spanning said gap and anchored on opposite edges to said rear enclosure and one of said seat part and said seat back.

12. A seat according to claim 11 wherein said flexible cover element includes a tensionable strip.

13. A seat according to claim 11 wherein said flexible cover element includes an elastically resilient net structure.

14. A seat according to claim 11 wherein said flexible cover element comprises a stiffening element extending over most of a width thereof.

15. A seat according to claim 14 wherein said flexible cover element comprises at least one rubber tension element extending in a tensioning direction thereof and bridging said gap.

16. A seat according to claim 1 wherein:
said cover assembly comprises a first cover element postionable in various locations relative to said rear enclosure; and
said first cover element is attached to a component articulated to a bearing structure of said seat part, located adjacent said gap and movable relative to said rear enclosure upon adjusting positioning of said seat part by said adjusting mechanism.

17. A seat according to claim 16 wherein:
said bearing structure comprises a front pair of upright legs and a rear pair of upright legs supporting said seat part on a bottom thereof; and
a toggle lever assembly extends between said rear pair of upright legs and between said seat part and the cabin floor, and comprises a toggle lever connected to said bottom of said seat part and pivotable when said seat part changes positions, said first cover element being attached to said toggle lever.

18. A seat according to claim 1 wherein:
said cover assembly comprises a first cover element postionable in various locations relative to said rear enclosure; and
said cover assembly comprises a second cover element extending in a direction of said first cover element and attached to a wall part of said rear enclosure adjacent said gap.

19. A seat according to claim 18 wherein said second cover element is movably attached to said wall part of said rear enclosure.

20. A seat according to claim 19 wherein said first and second cover elements include overlapping thin plates, where extents of overlapping of said thin plates change to accommodate sizes of said gap to be bridged.

21. A seat according to claim 20 wherein said second cover element is pivoted to said rear enclosure for rotation about an axis extending transversely of said seat part and said seat back, and is biased for releasable contact with an overlapping point on said first cover element.

22. A seat according to claim 18 wherein said shell body comprises an inner wall forming said rear enclosure and abutting said side walls, said second cover element being movably supported on said inner wall.

23. A seat according to claim 22 wherein said second cover is attached to said inner wall by a spring hinge.

24. A seat according to claim 18 wherein said second cover element extends essentially over an entire width of an intermediate space between said side walls.

25. A seat according to claim 18 wherein said second cover element slides on said first cover element in response to movement of said seat part relative to said rear enclosure.

26. A seat according to claim 1, wherein said rear wall of said rear enclosure is arranged apart of said seat back.

27. A seat according to claim 26, wherein said rear wall is arranged lower than a lower end area of said seat back with respect to the vertical direction.

28. A seat according to claim 1, wherein said side walls and rear wall of said shell body are fixed relative to said cabin floor.

* * * * *